United States Patent [19]

Hey

[11] Patent Number: 4,758,171
[45] Date of Patent: Jul. 19, 1988

[54] CABLE CONNECTION

[75] Inventor: Stephen A. Hey, Ottobrunn, Fed. Rep. of Germany

[73] Assignee: Raychem GmbH, Ottobrunn, Fed. Rep. of Germany

[21] Appl. No.: 934,600

[22] Filed: Nov. 25, 1986

[30] Foreign Application Priority Data

Nov. 29, 1985 [GB] United Kingdom ............... 8529454

[51] Int. Cl.⁴ ............................................. H01R 11/05
[52] U.S. Cl. ..................................... 439/181; 29/857; 439/730
[58] Field of Search ............... 339/111, 59 R, 143 R, 339/DIG. 1; 439/86–90, 181, 186, 187, 607–610, 278–282, 730; 29/857

[56] References Cited

U.S. PATENT DOCUMENTS 3,768,065 10/1973 Zemels ................................. 339/111
3,883,208  5/1975 Sankey et al. ....................... 339/111
4,629,277 12/1986 Boettcher et al. .................. 339/111

FOREIGN PATENT DOCUMENTS 139483 5/1985 European Pat. Off. .
1440524 6/1976 United Kingdom .
2116381 9/1983 United Kingdom .

OTHER PUBLICATIONS

"KAP-Insulated Cable Terminations from Kabeldon", p. 4.

Primary Examiner—John McQuade
Attorney, Agent, or Firm—Edith A. Rice; Herbert G. Burkard

[57] ABSTRACT

Connection between a high voltage electric cable and the bushing of a transformer is achieved by firstly terminating the cable using heat shrinkable insulation tubing and stress control material, and secondly push-fitting the terminated cable into an insulating elbow. Mechanical retention of the cable in the elbow also provides electrical connection therebetween, for subsequent connection on to the bushing.

9 Claims, 1 Drawing Sheet

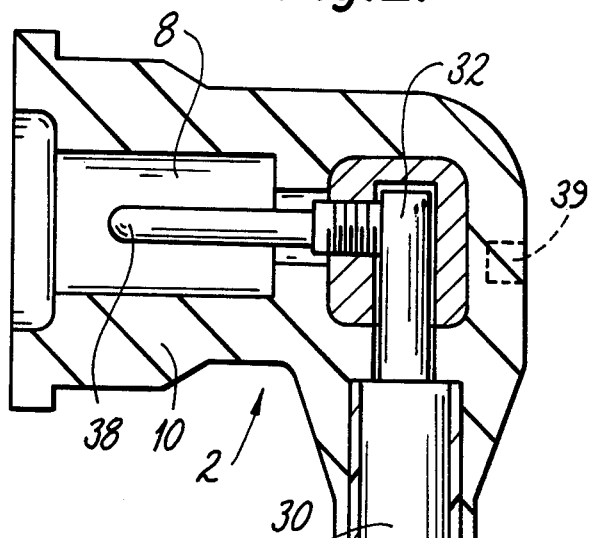
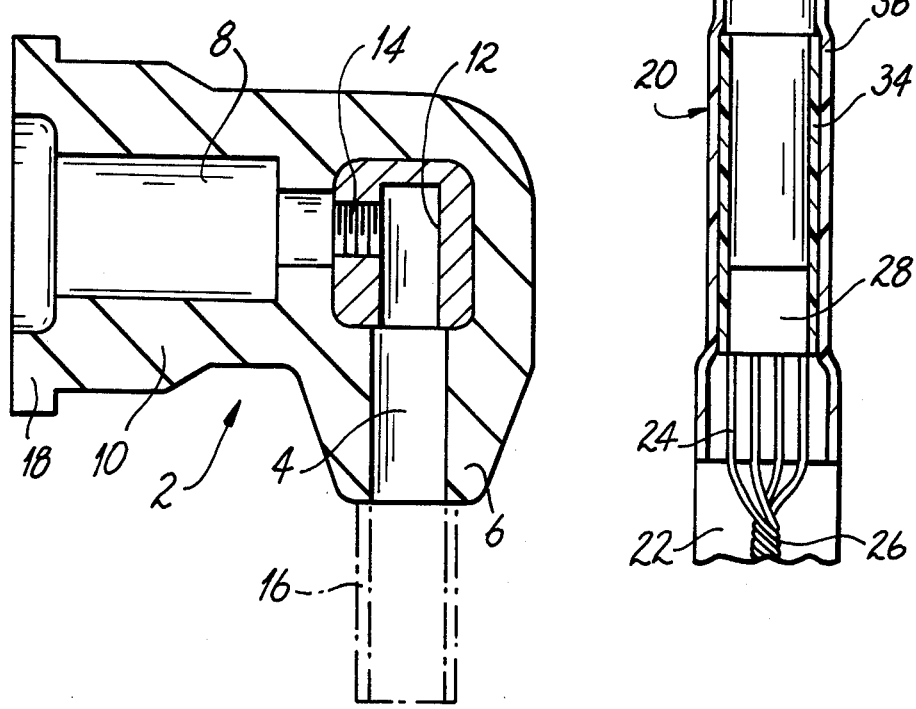

CABLE CONNECTION

This invention relates to an arrangement, a kit of parts, and a method of making a connection to an electric cable, and in particular, to the making of a connection to a cable such that the cable is conveniently connectable to and disconnectable from a bushing of electrical apparatus such as a transformer or switchgear. The connections are usually made at high voltage, that is to say in excess of 1 kV, and the invention is particularly, though not exclusively, applicable to the 12, 17.5 and 24 kV voltage ranges, for current ratings of 200, 400 and 630 Amps. However, the invention is also applicable to low voltage and current ranges.

Connections of the above-mentioned kind are typically made using connectors, sometimes called elbows or adaptors, which may be L-shaped or in-line. Such connectors are arranged to have one limb connected to the cable, and another limb having a passageway, usually of inwardly-tapering frusto-conical configuration, for receiving the bushing of the apparatus.

One such connector is disclosed in British Pat. No. 2116381, whereby an L-shaped electrically insulating polymeric body has a metal terminal moulded into one limb thereof. The terminal projects at one end from the body to form a lug for connection of a cable thereto. The cable is stripped for termination, has a lug mounted on to its conductor, and the cable and connector lugs are bolted together. This connection is then insulated by a heat recoverable tube that is shrunk thereover. The terminal at its other end is disposed at the inner end of a passageway that is mountable on to the bushing of a transformer, for example. The amount of space available for mounting a cable on to apparatus using this connector has to be such as to accommodate the length of the connector terminal in addition to the length of the stripped cable end.

A further such connector is disclosed in European Patent Application Publication No. 139483, the entire contents of which are incorporated herein by this reference. One embodiment of this connector is L-shaped and has a heat-shrinkable inlet that receives a stripped cable end therein. After insertion of the cable into the insulating connector, the shrinkable inlet is recovered down on to the cable to provide the stripped cable end with the required electrical insulation. Electrical connection is made by screwing a pin through a threaded aperture in a metal housing mounted in the connector and in which the cable conductor is disposed. Access for the pin to the housing is gained through a further passageway in the other limb of the housing, which subsequently is mounted on to a transformer bushing. This connector has the advantage over the first described connector in that insertion of the cable up into the connector results in a more compact arrangement. However, the manufacturing process is slightly complex in that a heat-shrinkable tubing has to be moulded into or otherwise secured to the material forming the main body of the connector.

With each of the above-mentioned configurations, access to the cable end subsequent to its attachment to the connector, is possible only by destroying the heat shrinkable covering thereover.

Another arrangement for connecting a cable to electrical apparatus involves the use of a heat-recoverable sealing boot. The cable is stripped, terminated with insulation material, and is provided with a metal connecting lug crimped on to the conductor. The boot is slid over the cable end, and the lug is bolted on to the electrical apparatus. The boot is then positioned as a loose fit over the bolted connection, and heated to effect its recovery to seal the connection between the cable and the apparatus. Re-entry to the bolted connection is made by cutting away the boot, and subsequently refitting a new one.

The difficulties of demountability and re-enterability discussed above are not present in connectors known as push-on connectors, in which the connector is of generally softer material and the stripped end of a cable is pushed into an inlet thereof forcing it to expand slightly so as to accomodate the cable and to form an environmental seal therearound. U.S. Pat. No. 3,883,208 shows one such typical connector. The arrangement disclosed in this patent, although compact, is however suitable only for lower voltage cables (generally less than about 7 kV) and only for cable having plastic (as opposed to paper-lead) insulation. Thus, there is no provision for controlling electrical stress at the end of the stripped screen of the cable. Furthermore, it is not generally feasible to form a push-fit connection on to paper-lead cable since the wrappings of the paper tend to unravel.

It is one object of the present invention to provide a versatile, demountable arrangement for connecting an electric cable to other electrical apparatus, overcoming or at least alleviating the above-mentioned problems.

In accordance with one aspect of the present invention, there is provided a cable connection arrangement comprising an electric cable and an electrically insulating connector for connecting the cable to electrical apparatus, wherein an outer insulating jacket of the cable has been removed to expose an electrical screen of the cable, the screen has been removed to expose primary insulation of the cable, and the primary insulation has been removed to expose a conductor of the cable, wherein the cable is terminated by electrical stress control material that extends over the exposed end of the screen and along at least part of the exposed primary insulation, and by electrical insulation material that extends in close conformity over the cable screen and over the stress control material;

and wherein the connector comprises: an insulating body having a first passageway that is arranged to receive the terminated cable as a push-fit therein, and a second passageway for engagement with the electrical apparatus; and electrically conductive means that is disposed in the insulating body so as to form an electrically conductive path between the conductor of the cable and the electrical apparatus when, in use, the cable is received in the first passageway and the electrical apparatus is engaged within the second passageway of the insulating body of the connector.

The arrangement of the invention thus envisages the cable being completely terminated and subsequently being introduced into and electrically and mechanically connected to the connector. Connection of the cable conductor to the conductive means of the connector may conveniently be made through the second passageway of the connector, so that disconnection of the cable from the connector may easily and conveniently be achieved once the connector has been removed from the apparatus.

The present invention thus provides the compact length associated with a push-on configuration, whereby the end of the cable extends up into the body of the connector, whilst allowing a simple moulding of a uniform material to be used for the connector body. The cable itself can be terminated in a standard manner with the minimum number of components.

Advantageously, the first passageway extends in a generally tubular manner away from the main body of the connector. Such a tubular extension may have a relatively thin wall, thus being flexible enough to stretch to accommodate a wide variety of cable sizes. A stretch ratio of up to about 1.3:1 may be obtained for the cable-engaging portion of the connector. Furthermore, the longer the length of the interface between the cable and the connector, the lower is the likelihood of any electrical breakdown taking place in this region, since the electrical stress is reduced. However, as discussed below, advantageously the cut back region of the screen of the cable is spaced apart from the connector insulating body.

A further advantage of terminating the cable, and in particular of providing it with an insulating layer, is that the connector itself does not need to provide all of the required insulation or stress control at the cable end. Consequently, the wall thickness of the connector, and in particular in the region of the first passageway, can be thinner than would be the case if it had to provide all the required insulation of the cable, and this again allows greater versatility in accommodating cable of different sizes. With the above-mentioned stretch ratio, for example, a single connector may be mounted on a terminated cable rated at 24 kV having a conductor cross-sectional area of from 95 mm² to 185 mm². A conventional configuration of push-fit connector would have a stretch ratio of no more than about 1.1:1, necessitating a different connector for each of the four standard cable sizes encompassed by the above range.

The stress control material and/or the insulation material used to terminate the cable may be in the form of a tubular member. That is to say, one or the other or each of them may be a tubular member, or the two layers may be a coextrusion. Alternatively, the stress control material may be a coating, which may be applied directly on to the cable or to the inner surface of the insulating material when in a tubular form. When a tubular configuration is employed, this may conveniently be recoverable, for example heat-recoverable.

A recoverable article is an article the dimensional configuration of which may be made to change appreciably when subjected to the appropriate treatment. The article may be heat-recoverable such that the dimensional configuration may be made to change when subjected to a heat treatment. Usually these articles recover, on heating, towards an original shape from which they have previously been deformed but the term "heat-recoverable", as used herei, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

It will be appreciated that the electrical stress at the end of the conducting screen of the cable can lead to electrical breakdown, and the stress control material of the arrangement of the present invention is arranged to reduce the stress. To this end, the material may be linear, that is to say to follow Ohm's Law, and may have a specific impedance within the range from about $10^6$ ohm-cm to about $10^{10}$ ohm-cm, preferably from about $5 \times 10^7$ ohm-cm to about $5 \times 10^9$ ohm-cm, and most preferably is about $2 \times 10^9$ ohm-cm. Alternatively, the stress control material may be non-linear, the electrical behaviour of which follows the equation:

$$I = kV^\gamma,$$

where
I is the current
V is the applied a c voltage
k is a constant, and
$\gamma$ is a constant $>1$.

A non-linear material is herein considered to have stress controlling properties if its impedance at 1 kV (a c)/cm is between about $10^7$ ohm-cm and about $10^9$ ohm-cm, and preferably is about $10^8$ ohm-cm, and at 10 kV (a c)/cm is between about $10^4$ ohm-cm and about $10^8$ ohm-cm, and preferably is about $5 \times 10^6$ ohm-cm.

The stress control material may conveniently be the heat-shrinkable polymeric tubing sold by Raychem under its trade name SCTM, and the insulation material may conveniently be the heat-shrinkable polymeric material sold by Raychem under its trade name HVTM.

Advantageously, the insulation material, such as HVTM tubing, put on to the cable, and also the material of the connector, is substantially electrically non-tracking, that is to say it has high resistance to the formation of carbonaceous paths over its surface when under voltage in operation, even in the presence of environmental contaminants such as water, salts and other pollution.

The insulation, and preferably non-tracking, material from which the connector is formed is resilient at least in the region of the first passageway so as to receive the cable therein as a push-fit. It will be appreciated that the more resilient the connector material is the greater can be its range-taking ability. That is to say, the connector will be able sealingly to accommodate a larger range of cable sizes and shapes—cable cores may be of circular or sector shape for example. However, a certain amount of mechanical rigidity is also necessary for the connector passageway. Accordingly, a preferred value for the Shore A Hardness of the connector material is between about 25 and 55, and typically would be about 45. Although only the region of the connector defining the first passageway need be particularly resilient, it is convenient, for manufacturing for example, to have the whole insulating portion of the connector, including the region around the second passageway, formed from the same material, for example rubber. Silicone materials have been found to be suitable for this purpose, the room temperature vulcanisable silicone materials, or the high temperature vulcanisable silicone material that are formed and cured by compression moulding. However, it is also envisaged that other materials, such as EPDM, would also be suitable.

The insulating body of the connector is preferably formed, for example moulded, as a one-piece component, thereby avoiding, or at least minimising the problems associated with high electrical stress at interfaces, whose sealing has to be assured for good electrical performance.

Typically the connector of the arrangement of the invention is of generally L-shape, having the first and second passageways generally perpendicular to one another, although the angle therebetween may be chosen to suit the particular application. For example, an in-line connection may be required. Furthermore, access to the interior of the connector to effect the connection between the cable conductor and the electrically conductive means may but need not be through the second passageway. For example, the connector may have a third passageway, advantageously such that the three passageways form a T-configuration, through which access is gained for making electrical connections. Such a third passageway may be sealed by a separate insulating plug member, which may incorporate a capacitive test point. The sealing plug may also comprise or include a surge arrestor for protection of the cable and/or apparatus from an overvoltage, such as a transient overvoltage due to a lighting strike for example.

The arrangement of the present invention is applicable to cables of various construction, including plastic insulated cables, rubber cables and paper-lead cables. When the insulation material put on to the cable to effect its termination is a polymeric tubular member for example, externally the cable then effectively is a plastic insulated cable, and as such is particularly suited for use with a push-on connector.

In accordance with another aspect of the present invention, there is provided a kit of parts for connecting an electric cable to electrical apparatus, comprising a tubular member of electrically insulating material, electrical stress control material arranged to be disposable within said tubular member, and a connector that comprises an electrically insulating body having first and second interconnecting passageways extending thereinto; whereby the tubular insulating member and the stress control material are suitable for terminating the electric cable, one of said passageways of the connector is arranged to receive the terminated electric cable therein as a push fit, and the other of said passageways is arranged to receive the electrical apparatus therein.

The insulating and stress control materials are advantageously as described above with reference to said one aspect of the invention.

In accordance with yet another aspect of the present invention, there is provided a method of making a connection to an electric cable, wherein an outer insulating jacket of the cable is removed to expose an electrical screen of the cable, the screen is removed to expose primary insulation of the cable, and the primary insulation is removed to expose a conductor of the cable; wherein the cable is terminated by electrical stress control material that extends over the exposed end of the cable screen and along at least part of the exposed primary insulation, and by electrical insulation material that extends in close conformity over the cable screen and over the stress control material; wherein the terminated cable is inserted as a push-fit into a first passageway of an insulating body of a connector that has electrically conductive means therein, and the cable conductor is electrically connected to the electrically conductive means; whereby the cable is electrically connectable by the connector to electrical apparatus that is engageable with the electrically conductive means by means of a second passageway of the insulating body of the connector.

It is to be understood that the method of the invention may use the features discussed above of the arrangement and kit of parts of the invention.

The cable connecting arrangement and method of the present invention will now be described, by way of example, with reference to the accompanying drawings, in which:

FIG. 1 is a sectional elevation of one embodiment of the connector;

FIG. 2 is a sectional elevation of a connector similar to the connector of FIG. 1 having a cable mounted therein;

FIG. 3 is a sectional elevation of a further embodiment of the arrangement.

FIG. 1 shows an L-shaped 200 amp connector 2 of a resilient electrically insulating and non-tracking silicone material. The connector 2 is moulded so as to have a cylindrical first passageway 4 extending along one limb 6 and a frusto-conical passageway 8 extending along the other limb 10, which extends generally perpendicular to the limb 6. A metal housing 12 is moulded into the connector 2 at the intersection of the passageways 4 and 8. The housing 12 is fully open to the passageway 4, and has a threaded aperture 14 therethrough directed towards the passageway 8.

The passageway 4 is arranged to receive a terminated cable therein as a sealing push-fit into the limb 6, and the passageway 8 is arranged to receive a mating frusto-conical bushing of a transformer, for example. The limb 6 may if desired be extended as a cylindrical tubular portion 16 as shown in broken lines in the Figure. The outermost portion of the limb 10 is flanged at 18 to enhance the mechanical connection on to the transformer.

FIG. 2 shows the connector 2 of FIG. 1 mounted on and electrically and mechanically connected to a 24 kV plastic insulated shielded cable 20. The cable oversheath 22 is cut back to expose the metal shield wires 24 which are bent back over the sheath 22 and formed into an earthing pigtail 26. The semiconductive screen 28 of the cable is thereby exposed, and is itself cut back to expose the primary insulation 30. Towards the end of the cable 20, the insulation 30 is cut back to expose the solid core conductor 32.

The prepared cable is then terminated by applying a semi-conductive stress control tubing 34 over the exposed portion of the cable shield 28 and along the cable insulation 30. The tubing 34 is a heat-recoverable polymeric member sold by Raychem as STCM tubing. The termination is completed by an insulating, non-tracking and weather-resistant tubing 36 that completely covers the tubing 34 and extends at one end over the shield wires 24 and at the other end along the entire exposed length of the cable insulation 30. The tubing 36 is a heat-recoverable polymeric member sold by Raychem as HVTM tubing.

The terminated cable 20 is then inserted as a push-fit into the passageway 4 of the limb 6 of the connector 2, such that the cable conductor 32 is disposed within the metal housing 12, and the limb 6 seals around the outer insulating tubing 36 of the cable. As shown, the tubing 34 is not long enough to extend into the connector 2, although it may do so. As can also be seen from FIG. 2, the lower end of the limb 6 does not extend far along the cable 20, but has an appreciable separation from the cut back of the cable screen 28, which is a region of high electrical stress. Thus, the end of the limb 6 of the connector 2, which is of relatively thin flexible material is not heavily stressed electrically. A metal connecting pin 38, threaded at one end, is introduced through the passageway 8 and engaged with the aperture 14 of the housing 12. The pin 38 is screwed in so as to contact the cable conductor 32 and press against the inner wall of the housing 12. The pin 38 has a hexagonal boss towards its inner end for attachment of a tool to ensure sufficient pressure contact on to the cable conductor 32. In this manner, the cable 20 is mechanically and electrically secured within the connector 2.

Mounting of the connector 2 on to a transformer bushing results in sealing of the limb 10 around the bushing and electrical contact being made with the bushing by the pin 38.

A metal insert 39, shown in broken line, may optionally be provided in the connector 2 adjacent the metal housing 12 so as to be capacitively coupled therewith. Use of a hot stick on the insert 39 can, in conventional manner, provide an indication as to whether or not voltage is applied to the bushing and cable. If desired, such an insert, or a metal plug-securing nut, exposed at the outer surface of the connector may be encapsulated within insulation material.

The embodiment shown in FIG. 3 has a cable 40 terminated as for the cable 20 of FIG. 2, but in addition, an apertured metal lug 42 is crimped on to the exposed end of the cable conductor up to the outer insulating layer 44 of the cable termination.

The 400 amp connector 46 of FIG. 3 is of generally T-shape, in that in addition to having a limb 48 for receiving the cable 40 in a manner analogous to the limb 6 of FIG. 1, and a limb 50 for receiving a bushing in a manner analogous to the limb 10 of FIG. 1, it has a further limb 52 aligned with the limb 50. Furthermore, electrical connection of the cable 40 to the connector 46 occurs in a manner different from that shown in FIG. 2. A brass connecting ring 54 is moulded into the resilient connector 46 coaxially with the aligned limbs 50 and 52, in the region of the limb 48. The ring 54 has a threaded aperture that receives therein a pin 56, which at one end extends as an electrical contact into the passageway 58 of the limb 50 and at the other end extends as a threaded member into the passageway 60 of the limb 52.

After the cable 40 has been terminated as described above, it is inserted as a push-fit into the limb 48 of the connector 40 so as to dispose the cable lug 42 adjacent the ring 54. The pin 56 is then screwed into the ring 54 so as to pass therethrough and through the aperture of the cable lug 42. A nut 62 is then introduced into the connector 46 through the passageway 60 of limb 52 and is mounted on the threaded end of the pin 56. The nut 62 is tightened so as securely to clamp the cable lug 42 to the connector ring 54, thus connecting the cable 40 securely mechanically and electrically to the connector 46. A co-operating rubber end plug 64 is pushed into the limb 52 so as to seal the passageway 60 around the electrical connection.

The plug 64 may advantageously have an internal or external hexagonal configuration at its outer end to facilitate its insertion into and withdrawal from the insulating body of the connector. Furthermore, the plug may engage with the exposed threaded end of the pin 56 to enhance its retention and sealing.

A capacitive voltage indicator may be provided in the plug 64.

In an alternative arrangement, the connecting pin may itself form part of the bushing of the electrical apparatus on which the connector is mounted, so that the cable is secured within the connector and the connector secured to the bushing by the single act of securing a nut on to the bushing pin as it projects into the plug passageway of the connector.

Since the connector 46 is made entirely of a resilient material, a metal support ring 66 is moulded into the wall of the limb 52 to provide rigidity in this region as the end plug 64 is inserted. The connector 46 with attached cable 40 is mounted on a bushing (not shown) in the manner described with reference to FIG. 2.

Alternative electrical interconnections between the cable and the connector may be employed, for example as described in the above-mentioned European Patent Application Publication No. 139483.

It will be appreciated that the access provided by the passageway 52 to the electrical connections within the connector 46 allows earthing or testing to be carried out on the cable and electrical apparatus. Furthermore, it is envisaged that by means of a suitable adaptor, a further cable may be connected to the pin 56 through the passageway 60. That is to say, two, or more, connectors may be stacked on top of each other and mounted on to the bushing of the transformer, or other electrical apparatus, thereby to connect two, or more, cables to a single transformer bushing, for example.

It will also be appreciated that where a three core cable is to be connected to respective bushings of a transformer or switchgear, then a separate connector, such as the connector 2 or 40, would be provided for each core.

Cable connection arrangements in accordance with the present invention have satisfied the following test conditions for a 24 kV system:
  (i) Withstand 55 kV(a c) for 1 minute,
  (ii) Have a partial discharge not exceeding 20 pC at 24 kV, and
  (iii) Withstand 125 kV peak impulse.

Although the 200A connectors of FIGS. 1 and 2 are shown as having only two passageways compared with the three passageways of the connector of FIG. 3, it is envisaged that the former connectors may also have the same general configuration, that is to say T-shape, having a plug sealing a third passageway thereof. Thus, features of the different connectors disclosed herein may be combined together as appropriate.

I claim:

1. A cable connection arrangement comprising an electric cable and an electrically insulating connector for connecting the cable to electrical apparatus, wherein an outer insulating jacket of the cable has been partially removed to expose a portion of an electrical screen of the cable, the screen has been partially removed to expose a portion of a primary insulation of the cable, and the primary insulation has been partially removed to expose a portion of a conductor of the cable, wherein the cable is terminated by electrical stress control material that extends over an end of said exposed portion of the screen and along at least part of said exposed portion of primary insulation, and by electrical insulation material that extends in close conformity over said exposed portion of cable screen and over said stress control material;

and wherein the connector comprises: an insulating body having a first passageway defined by a short thin flexible wall, said passageway being arranged to receive the terminated cable as a pushfit therein, and a second passageway for engagement with the electrical apparatus; and electrically conductive means that is disposed in the insulating body so as to form an electrically conductive path between the conductor of the cable and the electrical apparatus when, in use, the cable is received in the first passageway and the electrical apparatus is engaged within the second passageway of the insulating body of the connector.

2. An arrangement according to claim 1, wherein at least one of said stress control material and said insulation material is applied to the cable in the form of a tubular member of polymeric material.

3. An arrangement according to claim 2, wherein at least one of said tubular members is recoverable.

4. An arrangement according to claim 1, wherein the electrically conductive means comprises a housing for receiving the cable conductor and a contact pin that is threadedly connected with the housing to secure the cable conductor therein, the contact pin being insertable into the housing through the second passageway.

5. An arrangement according to claim 1, wherein a connecting lug is mounted on the cable conductor, and wherein the electrically conducting means comprises a plate to which the lug is secured.

6. A cable connection arrangement according to claim 1, wherein the Shore Hardness of at least that portion of the insulating body of the connector defining said first passageway is between about 25 and 55.

7. A kit of parts for connecting an electrical cable to electrical apparatus, comprising a tubular member of electrically insulating material, electrical stress control material arranged to be disposed within said tubular member, and a connector that comprises an electrically insulating body having first and second interconnecting passageways extending thereinto; whereby the tubular insulating member and the stress control material are arranged to terminate the electric cable, one of said passageways of the connector is arranged to receive the terminated electric cable therein as a push fit, and the other of said passageways is arranged to receive the electrical apparatus therein.

8. A kit according to claim 7, wherein the stress control material is in the form of a tubular member.

9. A method of making a connection to an electric cable, comprising the steps of: partially removing an outer insulating jacket of the cable to thereby expose a portion of an electrical screen of the cable; partially removing said screen to thereby expose a portion of primary insulation of the cable; partially removing said primary insulation to thereby expose a portion of a conductor of the cable; terminating the cable by (a) positioning electrical stress control material over an end of said exposed portion of the cable screen and along at least part of the exposed portion of primary insulation and (b) positioning electrical insulation material in close conformity over said exposed portion of the cable screen and over the stress control material; and inserting the terminated cable as a push fit into a first passageway of an insulating body of a connector that has electrically conductive means therein, and the cable conductor is electrically connected to the electrically conductive means; whereby, in operation, the cable is arranged to be electrically connected by the connector to electrical apparatus that is arranged to be engaged with the electrically conductive means by means of a second passageway of the insulating body of the connector.

* * * * *